June 14, 1955   W. D. RICHTER, JR   2,710,632
DRILL PRESS POWERED TOOL
Filed May 6, 1954

*INVENTOR.*
WOLFGANG D. RICHTER, Jr.
*BY*
ATTORNEYS

United States Patent Office 2,710,632
Patented June 14, 1955

2,710,632

DRILL PRESS POWERED TOOL

Wolfgang D. Richter, Jr., Hatboro, Pa.

Application May 6, 1954, Serial No. 427,964

1 Claim. (Cl. 143—70)

This invention relates to drill press powered tools and, more particularly, to a yoke-shaped tool adapted to be removably mounted on the table of a drill press and powered by the drill press.

Many users of the so-called home workshop type of tools frequently have use for a power driven jig saw or similar type of power driven apparatus. Generally, however, the cost of such apparatus is in excess of the utility which the user anticipates obtaining from the apparatus. Inasmuch as a substantial portion of the cost of such apparatus is the motor for driving the apparatus and a base or stand for supporting the apparatus and, inasmuch as most workshops of the type referred to are equipped with a drill press, the foregoing objections can be overcome by providing a type of apparatus which may be mounted on and driven by a drill press.

It is a primary object of the present invention to provide a tool in the form of a yoke which is adapted to be affixed to the table of a drill press and powered by the drill press. The tool may be of the type supporting a jigsaw blade, a sanding block or other oscillatory cutting tool or may, alternatively, be provided with a tool mounted between its open ends which may have other selected motions if desired.

These broad objects and other subsidiary objects of the invention will become apparent from the following description when read in conjunction with the accompanying drawing in which.

Figure 1:
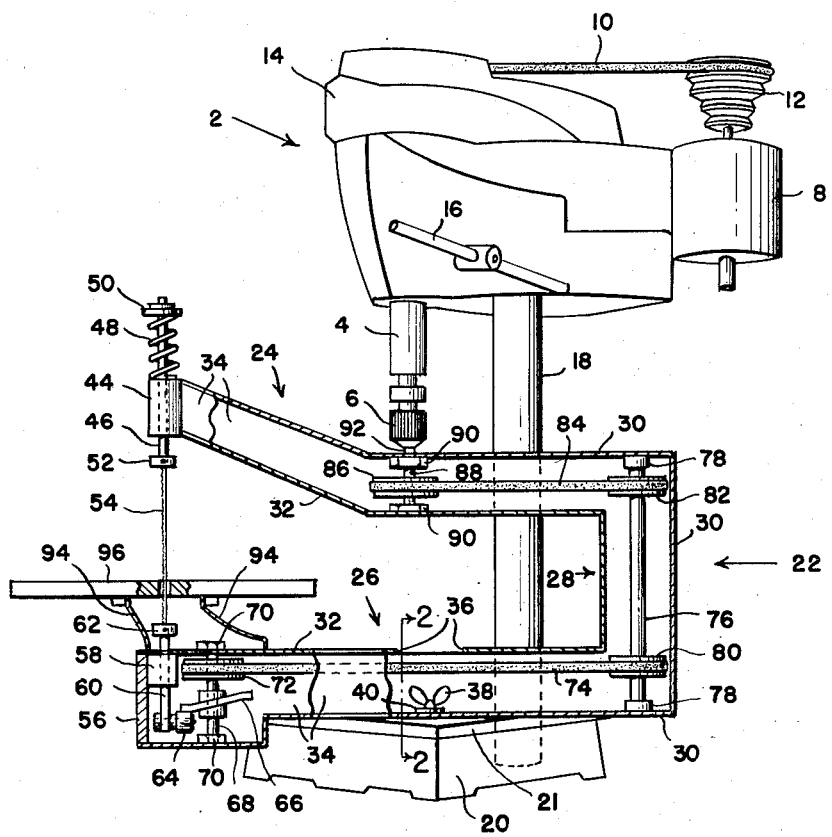
Figure 1 is an elevation partly in section showing the present invention.
Figure 2:
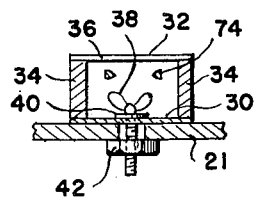
Figure 2 is a fragmentary section taken on the trace 2—2 shown in Figure 1.

Referring to the figures, there is shown generally at 2 the upper portion of a conventional drill press which includes a rotatable spindle 4 having affixed to its lower end a conventional chuck 6. The spindle 4 is driven by means of a motor 8 conventionally mounted at the rear of the drill press which drives the spindle 4 through a belt 10 connecting a pulley 12 driven by the motor with a pulley mounted within the housing 14 and driving the spindle 4. As is conventional in drill press construction, these pulleys include a plurality of belt receiving grooves of progressive diameters in order that the spindle speed may be adjusted by selecting the pair of pulleys with which the drive belt 10 is in driven and driving relation. The spindle 4 is provided with means including the rotatable control lever 16 for raising and lowering the spindle in the conventional fashion.

The upper assembly 2 is mounted on a column 18. A drill press table 20 is affixed to the lower end of the column 18 as shown in the drawing. It will be evident that the showing in the drawing is that of a table type of drill press. If a pedestal type of drill press is employed, the column 18 will extend downwardly and be affixed to a base plate and, generally, the table 20 will be provided with means whereby the table may be in sliding relation with the column 18 and may be clamped thereto in any desired position longitudinally thereon. The table 20 is provided with a plate 21 which normally includes suitable bores and slots by means of which a conventional drill press vice may be clamped thereto.

A yoke indicated generally at 22 and having an upper arm indicated at 24, a rear portion indicated at 28 and a lower arm indicated at 26 is positioned on the table of the drill press. The yoke includes an outer plate 30 extending around the yoke, an inner plate 32 and a pair of side plates 34. These outer, inner and side plates form a yoke of box section. The inner plate 32 is interrupted as shown at 36 on the inside of the lower arm of the yoke to provide access to a wing bolt 38 which passes through a suitable bore in the outer plate 30 of the lower arm of the yoke and through the central bore generally provided in the table plate 21 of the drill press. The bolt is adapted to enter a nut or other suitably threaded member 42 mounted under the plate 21 and to hold the yoke downwardly by bearing upon a suitable washer 40 positioned under the head of the bolt.

A block 44 is affixed to the outer or open end of the upper arm of the yoke and is provided with a suitable bore extending vertically therethrough and serving to guide a vertically positioned rod 46. A spring 48 is positioned between the upper surface of the block 44 and a spring retaining washer 50 which is affixed to the upper end of the rod 46. Thus the spring urges the rod 46 upwardly. The lower end of the rod 46 is provided with a mounting block 52 which is adapted to mount a jigsaw blade 54.

A plate 56 is affixed to the outer end of the lower arm of the yoke and is supported by the outer ends of the inner plate 32, the outer plate 30 and the side plates 34. A block 58 is affixed to the interior surface of the plate 56 and is provided with a vertically extending bore within which there is slidably mounted a rod 60. The upper end of the rod 60 is provided with a mounting collar 62 which is adapted to engage the lower end of the jigsaw blade 64.

The lower end of the rod 60 supports a cam follower 64 which is held in engagement with a cam plate 66 by the urging of the spring 48. The cam plate 66 is mounted on a vertically extending shaft 68 which is supported between bearings 70 affixed to the inner and outer yoke plates 32 and 30, respectively.

Also mounted on the shaft 68 is a pulley 72 which is driven by a belt 74 extending within the lower arm of the yoke.

Extending vertically within the rear portion of the yoke is a shaft 76 which is mounted at its upper and lower ends within bearings 78 affixed to the outer plate 30 of the yoke. Affixed to the lower portion of the shaft 76 is a pulley 80 over which the belt 74 passes and which serves to drive the belt 74. Affixed to the upper end portion of the shaft 76 is a pulley 82. A belt 84 passes over the pulley 82 and over a pulley 86 which is mounted on a shaft 88 positioned within bearings 90 affixed to the inner and outer plates 32 and 30 of the upper arm of the yoke approximately midway between the rear portion 28 of the yoke and the open end of the yoke. The shaft 88 has an upwardly extending portion 92 which extends upwardly above the yoke and is adapted to be engaged and driven by the chuck 6 of the drill press.

Affixed to the outer end of the lower arm 26 of the yoke are mounting plates 94 which extend upwardly and are adapted to support a horizontally extending plate 96 which is provided with a bore through which the saw 54 operates. It will be evident that the plate 96 affords the conventional work table which is employed in connection with the jig saw.

It will be evident that the tool described may be affixed by various means to the table of a bench type or pedestal type drill press or, alternatively, affixed to the base of a pedestal type drill press with the table of the pedestal drill press being swung to one side and, when the drill press chuck is secured to the driving shaft of the tool, the drill press may then be employed as a source of power to operate the tool and as a stand or base for the tool. It will also be evident that, while the invention has been described in conjunction with the use of a jig saw, any suitable cutting tool including a sanding block may be employed in place of the jig saw shown in the drawing. It will be further evident that the motion of the cutting tool is not limited necessarily to oscillatory motion. For example, rotary motion may very easily be imparted to the cutting tool if such motion be desired.

It will be evident that these and other modifications may be made to the embodiment of the invention disclosed herein without departing from the scope of the invention as set forth in the following claim.

What is claimed is:

A tool adapted for use with a drill press comprising a yoke of hollow section having a lower arm adapted to be removably clamped to the table of the drill press with the upper and lower yoke arms lying in a vertical plane, supporting means mounted on the upper and lower arms of the yoke adjacent to the open end thereof and adapted to movably support cutting means extending between said supporting means, the lower one of said supporting means including means for driving the cutting means and the upper of said supporting means including means for guiding the cutting means, means mounted on the yoke and extending above the yoke adapted to be engaged by the chuck of the drill press and driven thereby, and means mounted within the hollow section of said yoke for transmitting driving power between said driven means and said driving supporting means.

References Cited in the file of this patent

UNITED STATES PATENTS

| | | |
|---|---|---|
| 105,120 | Ogden | July 5, 1870 |
| 1,406,071 | Pavelka | Feb. 7, 1922 |
| 1,999,625 | Cammack | Apr. 20, 1935 |
| 2,436,692 | Greene | Feb. 24, 1948 |
| 2,670,018 | Coates | Feb. 23, 1954 |